United States Patent [19]

Janek

[11] Patent Number: 5,732,866
[45] Date of Patent: *Mar. 31, 1998

[54] TELESCOPABLE L-SHAPED SUPPORT BEAM WITH DEMOUNTABLE WHEELED CONTAINER

[76] Inventor: Nikolas Christian Janek, 789 Deepwoods, Aurora, Ohio 44202

[*] Notice: The term of this patent shall not extend beyond the expiration date of Pat. No. 5,620,126.

[21] Appl. No.: 698,301

[22] Filed: Aug. 15, 1996

Related U.S. Application Data

[63] Continuation-in-part of Ser. No. 611,124, Mar. 5, 1996, Pat. No. 5,620,126.

[51] Int. Cl.$^6$ .................................................. B60R 9/06
[52] U.S. Cl. ........................ 224/527; 224/526; 224/529; 224/282; 224/509
[58] Field of Search ........................ 224/280, 282, 224/488, 495, 498, 502, 522, 527; 296/37.1, 37.6; 414/462

[56] References Cited

U.S. PATENT DOCUMENTS

| | | |
|---|---|---|
| 2,136,157 | 11/1938 | Thomas. |
| 4,593,840 | 6/1986 | Chown .................................. 224/527 |
| 5,018,651 | 5/1991 | Hull et al.. |
| 5,029,740 | 7/1991 | Cox. |
| 5,106,002 | 4/1992 | Smith et al.. |
| 5,310,100 | 5/1994 | Liscinsky ................................ 224/527 |
| 5,395,020 | 3/1995 | King. |
| 5,439,151 | 8/1995 | Clayton ................................... 224/509 |
| 5,460,304 | 10/1995 | Porter et al. ............................ 224/521 |
| 5,586,702 | 12/1996 | Sadler .................................... 224/282 |
| 5,620,126 | 4/1997 | Janek ..................................... 224/526 |

Primary Examiner—Henry J. Recla
Assistant Examiner—Gregory M. Vidovich
Attorney, Agent, or Firm—Alfred D. Lobo

[57] ABSTRACT

A cargo carrier assembly (or "carrier") is externally carried at the rear of a truck. The carrier comprises a frameless L-shaped support beam in combination with a wheeled container specifically adapted to be pivotably loaded onto the rack by using pivot latches which matingly receive locking pins fixedly secured to the container. The L-shaped support beam ("L") comprises (i) an elongate rectilinear rail connecting said L to the truck, (ii) an overlying strut telescopable on the rail, and (iii) a rectilinear transverse strut integral with the overlying strut. Only a portion of the base of the container is either directly supported on the struts of the L-shaped support beam or supported on pivot pins. Though the container may be secured with only two pivot latches, it is preferred to use, in addition, an attachment latch. The width of the wheeled container is chosen so that it can be rolled in an inclined position through a doorway of a conventional dwelling, and the length is chosen so that, when loaded on the support beam the container does not obscure the tail-lights of the truck.

12 Claims, 6 Drawing Sheets

TELESCOPABLE L-SHAPED SUPPORT BEAM WITH DEMOUNTABLE WHEELED CONTAINER

This application is a continuation-in-part application of Ser. No. 08/611,124 filed Mar. 5, 1996, which is now U.S. Pat No. 5,620,126.

BACKGROUND OF THE INVENTION

This invention relates to a cargo carrier assembly (or "carrier") comprising a non-rotatably telescopable L-shaped support beam in combination with a wheeled container, the carrier being externally carried at the rear of a pick-up truck minivan, or sport-utility vehicle, individually and collectively referred to as a "truck" hereafter.

Numerous solutions to the problem of carrying a container for cargo outside an automobile or truck at the rear thereof, have been presented over the past six decades or so, each solution depending upon the manner in which the problem was perceived. Moreover, the dimensions of the container were rarely accorded much weight. In the novel carrier described herein, the container and its dimensions are essential considerations, as is the requirement that it be mounted, in its transport position, in close proximity to the rear exterior vertical surface of the rear bumper of the vehicle, or the exterior surface of the rear gate if there is no bumper, no more than 15.25 cm (6 inches); and, use of the carrier on an automobile is excluded.

Nearly a half a century ago, in U.S. Pat. No. 2,136,157 issued to Robt. J. Thomas, he disclosed a rearwardly extending swing-away rectangular frame on which a trunk is carried at the rear of an automobile, and the trunk is swung out of the way, in the vertical plane. U.S. Pat. No. 5,018,651 to Hull et al discloses a unitary T-shaped connection member, arms of which support a dumping container pivotably mounted on the T. Any end of the T may be inserted in a socket of a hitch on the frame of a track. The container is designed to be loaded empty and dumped, since if preloaded, there is no provision for lifting it on to pivot hinges on the cross-arm of the T. Further, the container is built on a tubular steel or angle iron framework and is not wheeled. The swivel wheel disclosed in '651 is for attachment to any point on the T-shaped beam. The container may be pivoted in any direction depending upon which end of the T is inserted in the trailer hitch. Irrespective of the direction in which the container is to be pivoted, the cross-arm of the T is provided with hinges permitting the container to be pivoted about the longitudinal axis as shown in their FIG. 1, or about the transverse axis as shown in their FIG. 2, so that the container may be dumped from the side or from the end. The longitudinal direction, corresponding to the forward and rearward directions in which the truck travels, is referred to as the x-axis herein; and the transverse direction at right angles to the longitudinal axis is referred to as the y-axis.

U.S. Pat. No. 5,029,740 to Gary L. Cox discloses a wheeled frame or dolly to which a container for luggage is integrally secured so that the dolly can be rolled to and releasably locked to a support arm uniquely designed to lift the dolly onto a support structure. Besides requiring the container to be secured to the dolly by means of straps placed within the container, it is necessarily transported in an inclined position behind the vehicle, rather than in a horizontal position in which it would not interfere with the driver's rear view through the rear window. To raise the container and dolly by pivoting it as shown, the pair of pivot arms used to lift the dolly into place requires a force far greater than that required to pivot the same container about twin oppositely disposed pivot pins positioned near the mid-points of the sides of a container, as is done in the surprisingly effective and simple invention described herein.

SUMMARY OF THE INVENTION

It has been discovered that a container having a rigid base may be adequately supported on a frameless rack comprising a single L-shaped support beam (referred to as the "L" for brevity) having rectilinear struts, one longitudinal and one transverse, which together directly support only one-half the area of the base. The single transverse strut allows the container to be pivotedly loaded onto, and unloaded from the L, but only from one side, the transverse strut being on the opposite side.

It is therefore a general object of this invention to provide a cargo carrier for a truck, the carrier comprising a rigid L-shaped support beam ("L") and a wheeled container having a tub with a rigid base which tub is manually, demountably locked on the upper surface of the support beam without the use of tools. An essential feature of the L is that it is planarly disposed and its transverse member is maintained closely adjacent and parallel to the truck's rear bumper. An elongate rectilinear connection member in the form of an elongate rail, connecting L to the truck's frame, is inserted in a strut which forms the longitudinal strut of the L, overlying the rail. The longitudinal strut of the L overlying the rail is referred to as the "overlying strut". Access into the rear of the truck, with the container locked on the L, is gained by sliding the container back on the elongate rail.

An essential feature of the container is that the axis of its wheels is near one end of the tub which has pivot pins secured on or near the container's base, the pins being located at a critical distance from the axis of the wheels, such that the pins may be received in pivot latches on the overlying strut without the wheels being lifted off the ground. The mounting of these pivot pins in opposed, linearly spaced-apart relationship, when matingly received in the pivot latches determines that only a portion of the base of the tub is directly supported on the support beam, this supported portion being about one-half the area of the base. Moreover, the tub is frameless, being preferably molded from a synthetic resinous material, optionally reinforced, or formed from a light metal.

It is a specific object of this invention to provide an L-shaped support beam in which the overlying strut is non-rotatably translatable on the rail. The overlying strut has a cross-section (in a plane at right angles to its longitudinal y-axis) which is assymetric about at least one axis. The elongate rail has a cross-section which cooperates with that of the overlying strut forming a telescopable assembly in which the overlying strut is non-rotatably longitudinally telescopable on the elongate rail. The L is formed with only the telescopable assembly and, the transverse strut; and, only the overlying strut carries pivot means which also function as latches because they receive and lock pins on the tub, hence referred to as "pivot latches". The struts of the L are positioned so that the container is directly supported (i) by the transverse strut extending adjacent the truck's rear bumper, about one-half the length (y-axis) of the container's forward side, and, (ii) by the longitudinal strut along the x-axis, across the container's base. The container is pivotably latched to the overlying strut of the L, and preferably also latched to the transverse strut.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
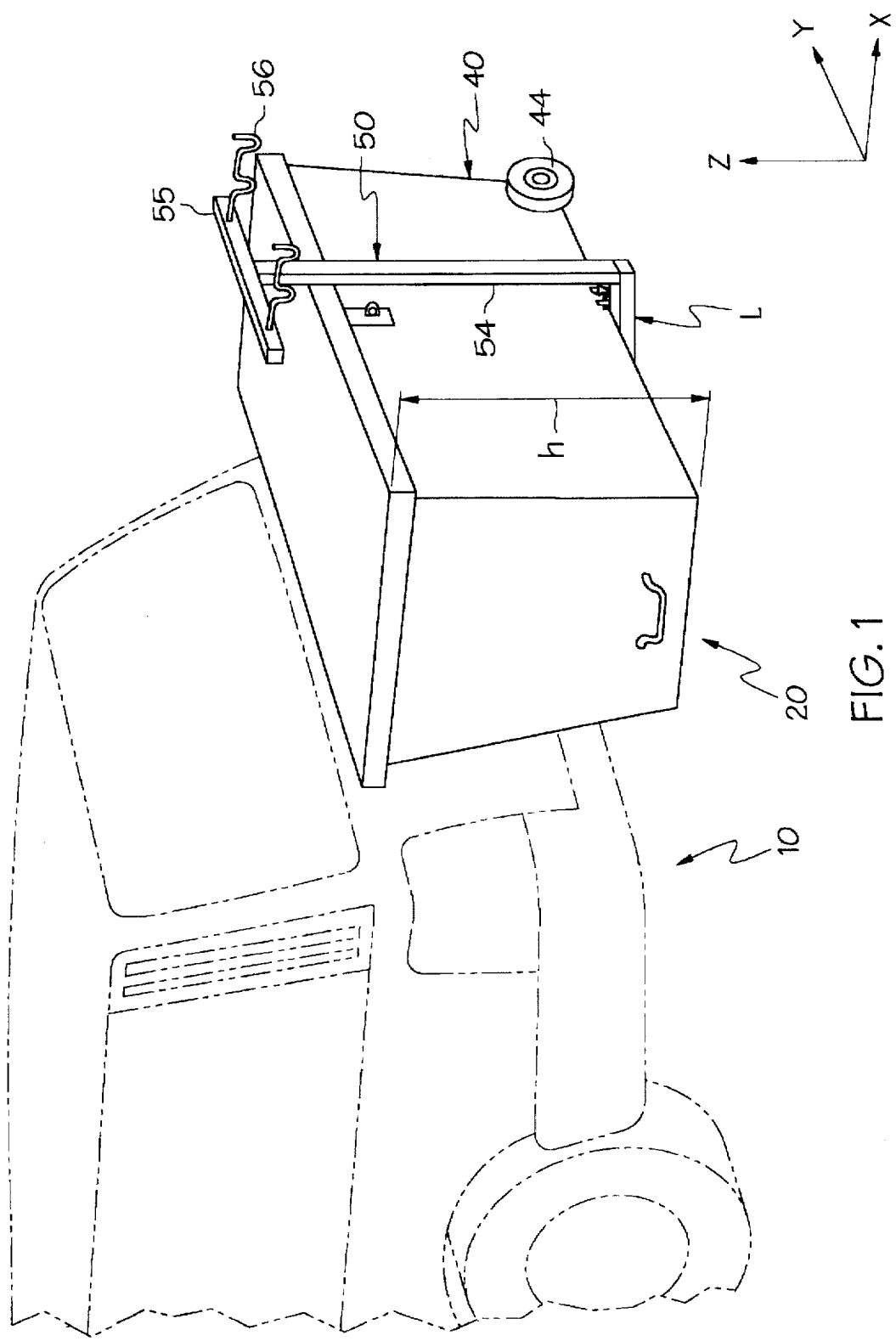
FIG. 1 is a generally schematic view of the carrier in transport position, the carrier including a L-shaped frameless rack, a wheeled container and an optional T-shaped accessory rack all carried behind a 4×4 sports utility vehicle provided with a socket for a trailer hitch fixedly attached to the frame of the vehicle.

Numerous suggestions for carrying a container on a rack have been proffered to date, but none has suggested a carrier comprising a combination of a frameless rack and a container designed and constructed to allow it (i) to be pre-loaded conveniently, for example with luggage, in a room of a house or motel/hotel (referred to as a "dwelling"); (ii) to be wheeled in an inclined position through conventional doors of the dwelling (such doors are generally about 30 inches wide, or 76 cm wide) to a position near the rack; then, without lifting the container off the ground, (iii) to be pivoted on cooperating pivot means (fixedly disposed on both the container and the rack) to lock the container on the rack, manually, by a single person of average strength, without using tools. Upon arriving at one's destination dwelling, the person may unload the container by (i) unlocking the locking means and pivoting the container without lifting it off the rack, so that the wheeled end of the container contacts the ground, then (ii) wheeling the container through conventional doors into the dwelling so that the luggage is transported from the truck in a single trip. The wheeled container, specifically designed as described to cooperate with the rack, thus permits the luggage to be easily and conveniently transported to a destination, then wheeled into the dwelling. This avoids leaving the contents of the container unattended outdoors, albeit still within the container which is typically provided with a lid locked to its body.

The L-shaped support beam is referred to as being "frameless" because it comprises only the telescopable assembly and the elongate transverse strut. By "integral" is meant that the components of each support beam are fixedly secured, for example, by welding.

The wheeled container has a tub with a rigid base particularly adapted to be pivotably loaded onto the rack, the tub being generally rectangular in cross-section, preferably with a lid for the tub, both made of light weight but strong materials. The tub is provided with at least two oppositely directed, spaced-apart pins secured to (hence referred to as "locking pins") and protruding longitudinally from its planar base, along a line drawn through the mid-portion of the base. Though a tub of conventional construction may be used, in the most preferred embodiment, the tub has no planar framework either internally or externally (hence "frameless tub"), to support the load carried in it, and when transported on the truck the tub is preferably secured with an attachment means on the transverse arm, in addition to the pair of pivot latches. The tub is therefore supported only on the transverse and overlying struts of the L-shaped support beam. The container may be loaded indoors with so much luggage that the container cannot be lifted off the ground by only one person; thus, goods including luggage, may be conveniently arranged within the tub with due care while indoors, irrespective of weather conditions outdoors, so that optimum packing is achieved for the travel conditions expected, and the container may then be wheeled outdoors through the doorways.

When the wheeled container is positioned on the rack the container's length (longest dimension) lies along the transverse y-axis; its width lies along the longitudinal x-axis; and its depth lies along the z-axis. The wheeled container can be rolled along the ground in an inclined position, preferably on a pair of wheels mounted, optionally vertically telescopably, one on each side, near each lower corner at one end of the container's base. That is, the wheels on the tub may be telescopable in a vertical direction to increase the distance between the axis of the wheels and the axis of the pivot pins, without moving the pivot pins. Additionally, the tub is provided with locking means fixed near the tub's base, which locking means cooperate with a pair of pivot latches and, optionally, additional locking means, either above or below the upper surface of the rack to secure the container. The preferred combination of two pivot latches, a third attachment latch, and locking pins on the tub, is unexpectedly effective and easy to use despite physical constraints of positioning the container closely adjacent to, preferably within about 30.5 cm (12") of the outer surface of the rear door of the truck which constraints appear to militate against using many known attachment means for manual operation. Thus the weight of a loaded container is kept as close to and above the truck's rear axle as is practical.

More particularly the cargo carrier allows a pre-loaded wheeled container to be rolled to the truck in an inclined position on two wheels, pivoted onto, and then secured on the rack. Further, it is critical that the length of the container (x-axis, when the container is on the rack) be less than the transverse distance (y-axis) between the truck's rear lights; the width is also critical since the container is required to pass through a conventional doorway of a dwelling when transported in an inclined position; and, the depth (z-axis) of the container is such that the lid of the container lies in a plane in which the view through the rear-view mirror of the truck is not obscured, preferably below the lower edge of the truck's rear window. Because of the limited depth of a tub which is typically available by a combination of such physical considerations, the internal volume of the container is in the range from about 15–30 ft$^3$ (0.42–0.85 cubic meters). Such considerations include the dimensions of a conventional truck, the load in the container which a person can conveniently handle, and the load which will not adversely affect the handling of the truck.

It will now be evident that the cargo carrier comprises in combination, a frameless L-shaped rack, an elongate rail for connecting the overlying strut of the "L" to the truck's frame, a container demountably locked along the longitudinal axis of the overlying strut of the L, and optionally, an accessory rack demountably attached to the overlying strut, the accessory rack comprising a vertical T-shaped member on which accessory articles such as skis or bicycles may be carried.

Referring to FIG. 1 there is shown a 4×4 sport utility, vehicle, indicated generally by reference numeral 10, to which a carrier assembly, indicated generally by reference numeral 20 is removably attached. Typical of such sport utility vehicles are the Chevrolet Blazer, the Ford Explorer, and the Nissan Pathfinder. Other suitable vehicles are pick-up trucks such as the Dodge Ram, the Ford F150 and the Chevrolet C-1500 or K-1500. Still other suitable vehicles are vans and minivans. The "cargo carrier" or "carrier assembly" 20 refers to a combination of L-shaped rack L, and the wheeled container indicated generally by reference numeral 40, which is secured to the rack with pivot means which also serve as attachment latches. Optionally, for use as a bicycle carrier, ski rack and the like, a removably mounted, accessory rack 50 of arbitrary construction, preferably having a vertical T-shape, with appropriate accessory suspension means, is provided.

Figure 2:
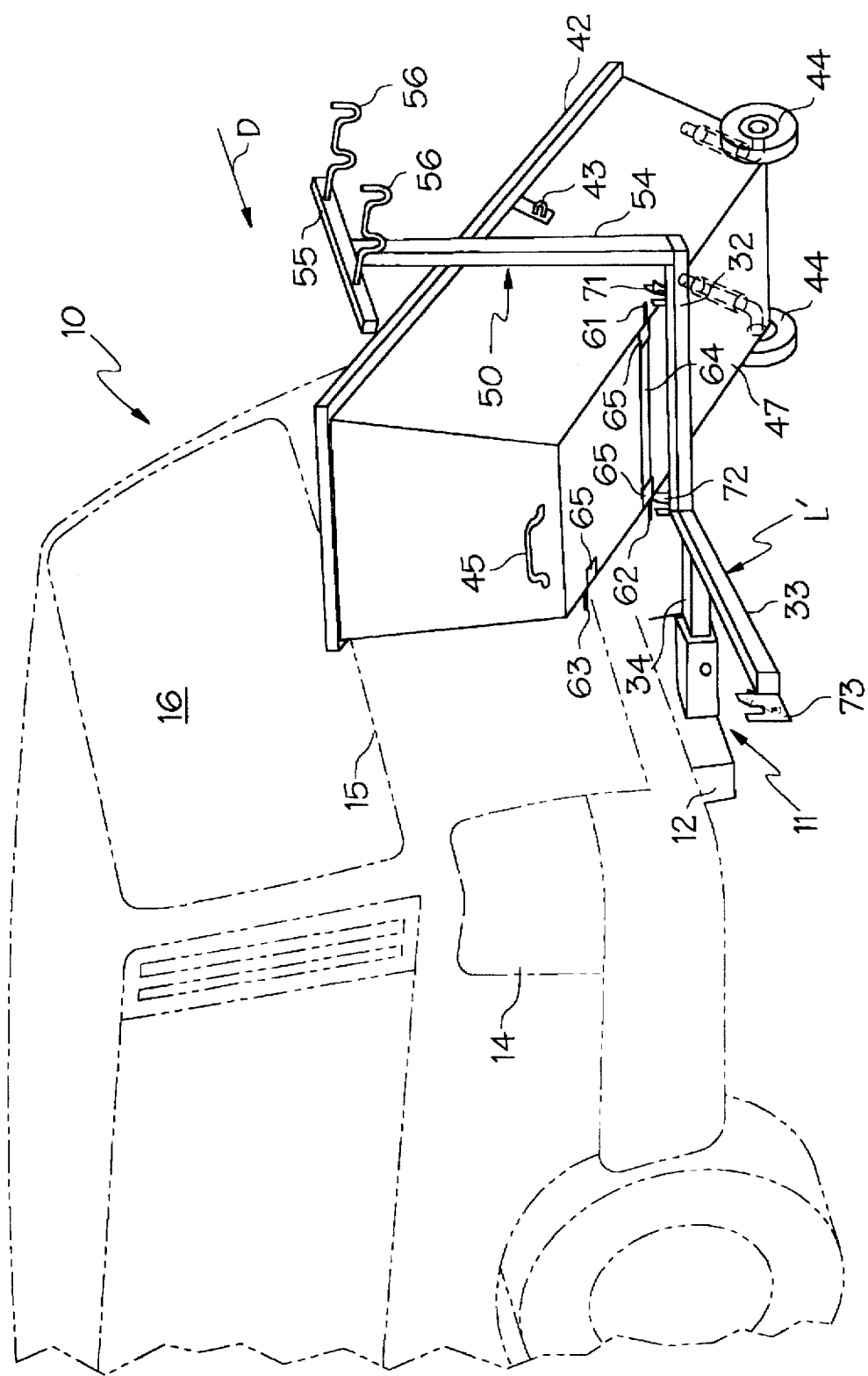
FIG. 2 is a generally schematic view of the container as it rests in position to be pivoted onto the rack comprising an integral planar L-shaped support beam connected to the truck with an elongate long rail desired, the accessory rack shown in position, may be positioned before or after the container is positioned. Locking pins on or near the bottom of the tub of the container are held in a pair of oppositely disposed pivot latches along the longitudinal axis of the rack so that the container may be pivotably disposed on the hollow longitudinal strut of the L.

Referring to FIG. 2, there is shown a L-shaped support beam L, removably connected in a hitch 11 of the truck's frame 12 with a rail 34 slidably disposed within the overlying strut 32. A wheeled container 40 can only be loaded onto L in the direction of the arrow D, that is, from the right hand side (the passenger's side) of the truck. The container 40 typically has a rigid unitary body with an internal volume of more than 15 ft$^3$ (cubic feet) and is too large to be carried exteriorly of a conventional automobile; and, if the container is used for its intended purpose as described herebelow, the loaded container transported on an automobile would adversely influence the normal operation and handling of the automobile.

The tub 41 has substantially vertical walls and an integrally formed, generally planar base 47, preferably of glass fiber reinforced ("GFR") synthetic resinous (plastic) material, a metal composite or aluminum. Alternatively, the tub may be formed from a substantially rigid unreinforced plastic material. By "substantially rigid" is meant that the tub, upside down, can support a load of about 300 lb (136 Kg), or the weight of two average persons standing or sitting on the tub's planar base with no readily visible deflection of the base or walls. The tub is preferably rigid enough to be supported on its locking pins without also supporting the lower surface of its planar base, though, to minimize stresses on the base, it is preferred to support the planar base when the locking pins are secured in their attachment latches. A preferred container is 117 cm long×68 cm wide×71 cm deep (46"×27"×28") and has an interior volume sufficient to carry plural suitcases and/or other personal effects, such as hiking or biking gear (collectively referred to as "luggage" hereafter), which would not only occupy too much space if stored within the vehicle, but would also be required to be handled individually for loading and unloading into the truck. A suitable container is commercially available from Better Way Products Inc., New Paris, Ind. 46553.

The unique L-shaped design allows the L to be connected to the truck only by the elongate connection member through the overlying strut of the L, but necessitates the wheeled container be side-loaded and unloaded onto the L from one direction only. This is done by pivoting the container about the longitudinal axis (x-axis) of the overlying strut. The L is most preferably formed from rectangular steel or aluminum tubular stock. The rectangular stock presents a large enough surface so as to avoid the generation of stresses within the matrix of the synthetic resinous material from which the container is preferably formed. Such stresses are relatively large when the container rests on cylindrical tubing and such stresses are deleterious to the useful life of the tub.

The L is attached to the truck with the single elongate mounting rail 34, preferably also having a rectangular cross-section which slidably fits within the overlying strut 32. The mounting rail 34 is slidably, removably inserted into a securing means such as a square tubular receiver which provides a trailer hitch 11 or socket fixed to a rigid member which is part of the truck's frame. The mounting raft 32 is necessarily a long rail, long enough to allow the L enough longitudinal movement with the container on it, to open the truck's rear gate without demounting the container. The mounting rail 34 is typically more than about 46 cm (18 ins) long, preferably in the range from 50 cm (20") to 76 cm (30") long. The position of the container moved away from the rear of the truck, that is, distally disposed, is referred to herein as having the L in an "extended position". In the transport position, when the truck is moving with the container on the L-shaped support beam, the overlying strut is slid forward on the rail to position the container close to the rear bumper. The position of the container proximately disposed near the rear of the truck is referred to herein as having the rack in a "retracted position".

Figure 3:
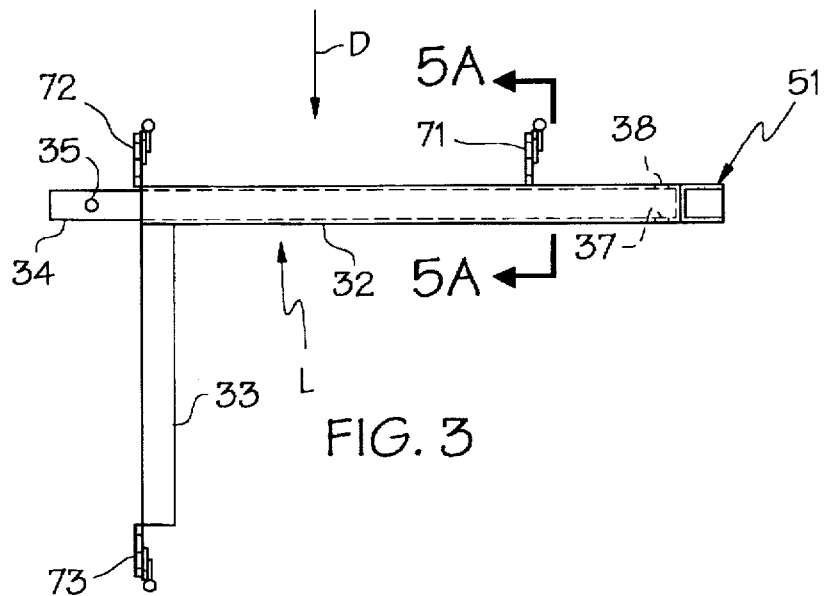
FIG. 3 is a plan view of the L-shaped support beam in the retracted position on the elongate rail (dotted outline), without the T-shaped accessory rack, showing the use of the two pivot latches and an additional spaced-apart locking means such as an attachment latch.

As schematically illustrated in FIG. 3, L is an integral support beam having only a longitudinally (x-axis) extending overlying strut 32 and a transversely (y-axis) extending rectilinear strut 33. By "integral" is meant that the struts of L are fixedly secured, for example, by being welded. The rail 34 and overlying strut 32, are each provided near their distal ends with matching passages 37 in the rail 34, and 38 in the overlying strut 32, to allow a locking pin 39 (see FIG. 4) to be inserted through the passages when aligned, to lock the overlying strut to the rail.

Figure 6:
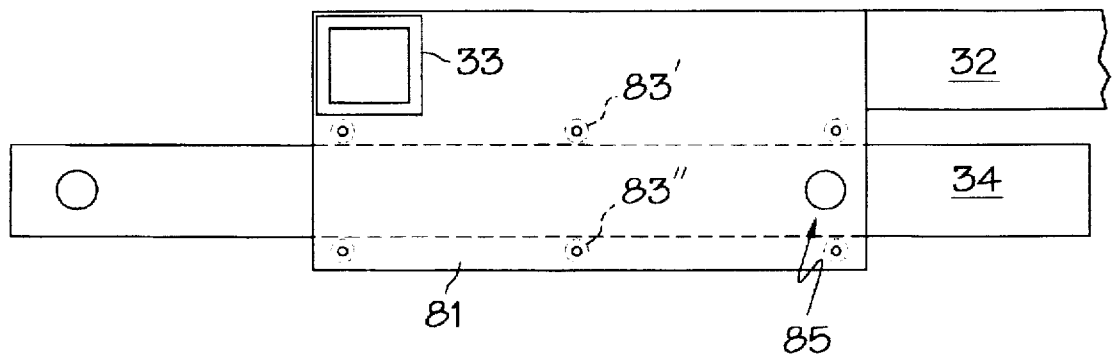
FIG. 6 is a side elevational view of another embodiment of a telescopable assembly of a rail spaced apart from an overlying strut by bearing means which facilitate slidable motion of the overlying strut on the rail.
Figure 7:
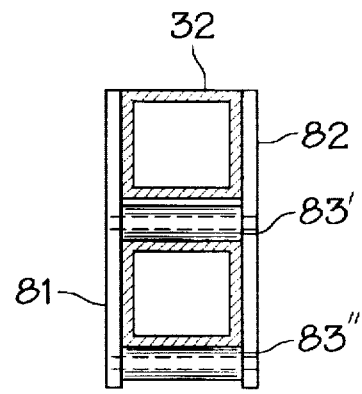
FIG. 7 is a cross-sectional view along the line 7—7 of FIG. 6.

Referring to FIGS. 6 and 7 are details of another embodiment of telescopably disposing the strut 32 overlying rail 34, comprising a pair of vertical parallel plates 81, 82 spaced apart on each side of the overlying square tubular strut 32 by being secured, preferably by welding, to the outer surfaces of the sides. The plates extend downward on either side of square tubular rail 34 and are connected above and beneath the rail 34, by upper and lower bearing means 83' and 83" respectively. The overlying strut 32 is supported on the upper bearing 83' which allows translation of the strut 32 along the upper surface of rail 34. Though only the upper bearing means adequately provides for good movement, it is preferred to provide, in addition, a lower bearing means for better movement of a heavy load. The rail 34, in turn, is supported by lower bearing 83" along the lower surface of rail 34 facilitating translation of the strut 32 on rail 34 which is sandwiched between both upper 83' and lower beating means 83". A pad of substantially rigid, synthetic resinous material having a coefficient of friction lower than that of aluminum on aluminum, such as nylon or Teflon, allows slidable relative movement of the strut and rail. Most preferred are rollers, whether metal or non-metallic, e.g. nylon, or polyurethane having a hardness of at least 60 Shore D, secured between the plates by pins or shoulder bolts which can be tightened without squeezing the plates together. The plates 81, 82 and rail 34 are provided with aligned matching through-passages for a bolt 85 which locks the telescopable assembly on the rail 34.

As shown in FIG. 2, the accessory rack 50 comprises a vertical tubular post 54, preferably of rectangular stock into the base of which, stub 51 is insertable, and the base is provided with matching passages (not shown) to allow fastening pins to be inserted through the passages when aligned with passages 52 and 53 in the stub 51. The top of the post 54 is secured to a cross-member 55 on which connecting means for accessories, such as suspension hooks 56 (shown), or clamps for skis, are provided for carrying the particular accessory. The simple construction of the accessory T-rack lends itself exceptionally well to be combined with the rack of this invention.

The carrier assembly 20 comprises the L-shaped support beam L and the wheeled container 40 having a tub 41 having no greater a specified critical volume than the range set forth above, the tub being provided with a lid 42, preferably hinged. The tub 41 is generally a parallelpiped and the hinged lid 42 is preferably provided with a hasp 43 to lock the container. The container can only be loaded or unloaded from the top when the lid is in the upright position. If loaded with suitcases, plural suitcases may be ganged, positioned so that handles of the suitcases are uppermost. A typical suitcase (not shown) is loaded with its longer dimension along the x-axis so that the depth of the tub is from 10% to 50% to greater than the height of the suitcase placed within the tub, but the depth is such that the height "h" of the container 40 with the lid 42 closed is preferably no greater than the distance of the lower edge 15 of the rear window 16 from the upper surface of L. The width of the tub (measured along the longitudinal x-axis) is typically at least as wide as the longest dimension of a typical suitcase. The length of the tub (measured along the y-axis) is less than the distance between the inner edges of the rear tail-lights 14 (only one of which is shown), so the tail-lights are visible from the rear when the container is on the rack. It will now be evident that the tub 41 will be longer than it is wide, and its width is limited by the width of a doorway through which the container is to be wheeled. Such containers are commercially available either formed from GFR plastic, or of thermoformed acrylonitrile-butadiene-styrene ("ABS") copolymer. For optimum rigidity and light weight the container may be made of a suitable synthetic resin reinforced with whiskered carbon fibers using technology conventionally used in the fabrication of golf clubs, tennis rackets and certain military aircraft. Casters 44, preferably solid rubber wheels, are provided along a common longitudinal axis, near opposed lower corners of the tub at its one end. The manner in which the wheels 44 are fixedly attached to the tub 41 is not critical but for optimum adjustability, namely to minimize the vertical distance through which the tub is to be pivoted onto the longitudinal strut 32, it is preferred to use telescopable wheels, telescopable along the length of the tub (y-axis in FIG. 1). At its other end, the tub 41 is provided with a handle 45 with which sufficient force is applied to rotate said container in a vertical plane at right angles to the longitudinal axis, onto the rack.

Positioned about midway between the handle 45 and the common axis of the wheels 44 are oppositely disposed, substantially co-axial locking pins 61, 62 which are matingly received in pivot latch means 71 and 72 when the tub is wheeled against the overlying strut 32, without lifting the wheels off the ground. The distance of the mounting axis of the pivot pins 61, 62 from the axis of the wheels is therefore at least the same as the height from the ground at which the pivot latches 71, 72 are mounted. The locking pins 61, 62 and 63 are typically in the range from about 0.65 cm to about 1.6 cm in diameter, about 1.25 cm being preferred; and in the range from about 2.5 cm to about 7.5 cm long, about 5 cm being preferred. Such pins are conveniently provided on small laminar pads which are fixedly secured to the base. The locking pins project from the pads, and the pivot latches are oriented to receive the locking pins so that the pads are supported on the longitudinal strut and the transverse strut, the longitudinal strut extending across the base and the transverse strut extending along only one side of the tub. Pads may be in the range from about 2.5 cm×2.5 cm to about 10 cm×10 cm, about 5 cm×5 cm being preferred. The thickness of a pad 65 secured to the base preferably corresponds to the diameter of the pin, the pin projecting from the edge of the pad as shown in FIG. 2. Pads (not shown) may be secured to the side-walls of the tub, near the base, if the height of the slots in the pivot latches dictates. Pads secured to the sidewalls of the tub, adjacent the base, will have pins projecting at right angles to the surface of the pad secured to the sidewall. Most preferably, the locking pins 61 and 62 are provided on the ends of a rigid strap 64 fixedly secured to the base, which strap locates these pins accurately. The pads and/or strap may be secured to the base with adhesive or with a fastener which is inserted through the base. The pivot pins may also be located along an axis above the coaxial wheels.

The tub 40 is secured on the rack L with at least two longitudinally (x-axis) opposed mating attachment means, and preferably three, fixed on the tub and rack, and two of the attachment means are pivot means. At each location, the upper portion of the locking means is fixed on the tub's side-wall just above the tub's planar base 47, but more preferably, is fixed to its base, and the lower portion is fixed to the struts of the rack. The upper portion comprises the two spaced apart, opposed mating pivotable portions, such as locking pins 61 and 62, each of which is matingly held in a pair of spaced-apart pivot latch means, namely container pivot latches 71 and 72 respectively. The spacing of the pivot latches corresponds to the width of the base of the tub, and is typically slightly greater than the width so as to allow the tub to be pivotably located between the two pivot latches.

Preferably the upper portion comprises a third locking pin 63 to be matingly held in a third container attachment latch 73. Alternatively, a hasp may be used, one portion of the hasp secured to the tub 41 and the other to the strut 33; or, a clevis through the upper portion of which a bolt is secured. As will be evident, for safety, the tub preferably carries, fixed securely thereto, the upper portion of a mating locking means, and the lower portion is positioned on strut 33, preferably near the end thereof. The particular attachment means used is not narrowly critical being chosen for conveniently securing the container on the transverse strut 33.

The locking means locks the container at two oppositely disposed positions in the mid-portion of the base, preferably near the longitudinal mid-line (x-axis) of the tub, and at a third position near the end of a transverse (y-axis) strut of the rack so that the tub is supported for transport along one edge of its planar base, and across its mid-line, only. The mid-fine refers to a line drawn along the x-axis near or through a line dividing the planar bottom in halves. The tub is provided with a handle 45 to pull or push the container, and to exert the force necessary to pivot the container onto the rack. It will be evident that the force required to pivot the container about the longitudinal strut of the rack is a function of the distance from the handle to the mid-line along which the locking pins are located. The greater this distance from handle to mid-line, the less the force required. But the distance from the mid-line to the axis of the wheels on the bottom of the container determines whether the locking pins can be inserted in the pivot latches on the longitudinal strut without lifting the container off the ground. With vertically telescopable wheels, the locking pins on the tub can be positioned so that the pins may be inserted in the pivot latches, and the tub pivoted into position with a minimum of force.

Reverting to FIG. 2, the socket 11 typically has a square cross-section in which the hollow square tubular interior measures about 5.1 cm×5.1 cm (2"×2") which is just large enough to slidably receive a square tubular rail 34. The overlying strut 34 is preferably also 2"×2". Near one end of the longitudinal strut 32, which end is distally disposed relative to tubular socket 11 fixedly secured to the frame 12 of the vehicle, is provided a vertical mounting stub 51 of rectangular tubular steel into which the accessory rack 50 may be removably slidably disposed. Near the other end of strut 32 which end extends beyond the welded connection of the transverse strut 33 to longitudinal strut 32, the strut 32 terminates in a rectangular tubular rail 34 which slides into the rectangular tubular steel socket 11. The overlying strut 32 is at least as long as the planar base 47 is wide, and the transverse strut 33 extends at right angles to strut 32, and generally parallel to, and in close proximity with the bumper. At least two spaced-apart pivot latches 71 and 72 are fixedly secured to the strut 32 at a distance corresponding to the width of planar base 47 which pivot latches matingly receive locking pins to allow the container to be pivoted onto L.

Referring to FIG. 3, the tubular socket 11 and rail 34 are each provided with matching through-passages 13 and 35 respectively, preferably in the transverse direction, through which a cross-bolt or fastening pin is to be inserted and secured in the usual manner with a locking Cotter pin (not shown). It is essential that each latching means be an attachment means to both, receive a locking pin, then secure it; and, that the locking pin be pivotable in two of the latching means which are spaced-apart on the longitudinal strut of the rack. Thus two spaced-apart pivot latches 71 and 72, and more preferably a third attachment latch 73, are provided on the support beam, preferably by welding them in positions so as to each matingly receive a locking pin introduced in the desired direction whether vertically or horizontally. Most preferred latching means is one such as pivot latch 71 commonly referred to as an "attachment latch" shown in greater detail in FIG. 5A, as viewed in the direction A—A in FIG. 3.

Figure 4:
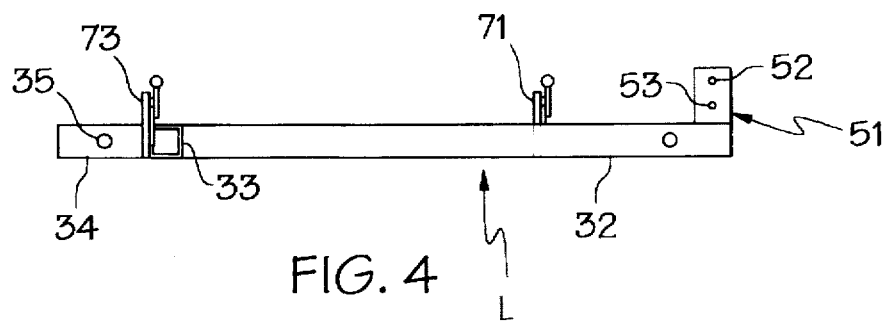
FIG. 4 is a side elevational view of the L-shaped support beam shown in FIG. 3.

Referring to FIG. 4 there is shown a side elevation view of L in which only two pivot latches 71 and 73 are shown. If accessory rack 50 is to be mounted, a stub 51 is provided with a pair of vertically spaced apart matching through-passages 52 and 53 respectively, preferably in the transverse direction, through each of which a fastening pin is to be inserted and secured in the usual manner with a locking Cotter pin (not shown).

Figure 5A:
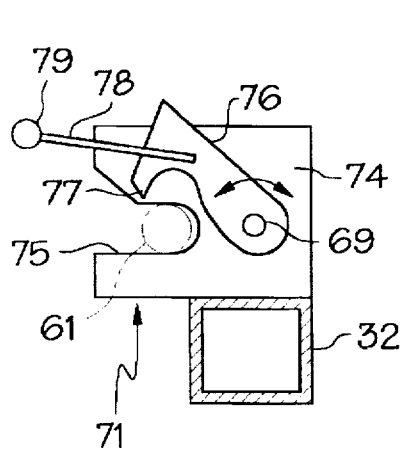
FIG. 5A is a detail of a locking pin (shown in phantom outline) in an attachment or pivot latch fixedly secured on the upper surface of a longitudinal strut, with the latch's U-shaped slot opening to one side, the latch in a horizontal position.

Referring to FIG. 5A, pivot latch 71 comprises a laminar plate 74 having a horizontal, generally U-shaped slot 75 with one of its sides (the upper) flared upward to facilitate guiding a locking pin 61 into it. The locking pin 61, shown in phantom outline, is releasably held in the U-shaped slot by a pivotable catch 76, such as either a manually actuated, or a spring-loaded pawl having a hooked end 77 which fits over the locking pin 61. In the manual mode, the catch 76 is pivotable on a pin 69 about an axis at right angles to the plate 74 with a handle 78 secured to the catch at the end of which handle a ball 79 provides enough weight to hold the catch 76 in position over the locking pin 61. Alternately, the hooked end 75 may be held in place over the pin 61 with a safety pin (not shown). The handle 78 is typically welded to the plate 74 at a location which does not interfere with insertion and release of the locking pin in the slot. As shown, pivot latch 71 is fixed to strut 32 so that both the catch 76 and the handle 78 are on the outside of plate 74 so as to allow the tub 41 of the container 40 to be slid between the plates of the latches 71 and 72. Pivot latch 72, constructed in the same manner as pivot latch 71, is similarly fixed to strut 32, with the U-shaped slot 75 in the horizontal position, and its handle 78 on the outside of plate 74. The tub 41 may therefore be received between the opposed plates 74 of pivot latches 71 and 72.

Figure 5B:
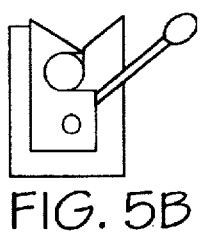
FIG. 5B is a detail of a locking pin (shown in phantom outline) in an attachment or pivot latch fixedly secured on the upper surface of a longitudinal strut, with the latch's U-shaped slot opening upward, the latch in a vertical position.
Figure 5C:
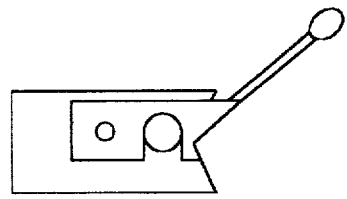
FIG. 5C is a detail of a locking pin (shown in phantom outline) in an attachment or pivot latch fixedly secured on the end of a transverse strut with the latch's U-shaped slot opening to one side, the latch in a horizontal position.

As shown in FIG. 3, a third latch, attachment latch 73, constructed in the same manner as pivot latches 71 and 72, is similarly fixed to strut 32, at the end thereof, except that the U-shaped slot 75 is in the vertical position, shown in the detail schematic illustration FIG. 5B, open at the top to accept a locking pin lowered into the opening, and as before, both the catch 76 and handle 78 are on the outside of plate 74. The distance along the strut 33 at which attachment latch 73 is located is not narrowly critical, being chosen so as to matingly receive locking pin 63 located near the end of the base. The orientation of the U-shaped slots in latches 71, 72 and 73 is likewise not narrowly critical, and may be in either the horizontal or vertical position, but for safety, at least one, and preferably all three of the latches used on the L-shaped support beam should be positioned with the U-shaped slot in an upwardly inclined, preferably vertical, position as shown in FIG. 2, to ensure that the container 40 is securely and safely held in position.

With the pivot latches 71 and 72 and attachment latch 73 positioned as shown in FIG. 3, and the locking pins 61, 62, and 63 secured to pads 65 on the lower surface of the base, it will be seen that the upper surfaces of struts 32 and 33 will be in contact with the planar base, supporting it along a portion of its side and across its width, providing support for the base of the container. Thus the pivot latches are oriented to receive the locking pins so that the longitudinal strut and the transverse strut are each in direct contact with the base's lower surface, the longitudinal strut extends across the base and the transverse strut extends along only one side of the tub. As shown, locking pins are provided in the 'near' (relative to the loading direction) half of the tub's base so that when held in pivot latches 71 and 72 on strut 32, it extends across the base m the near half; and, strut 33 is more than one-half, typically about 56 cm (22"), the length of the tub, so that attachment latch 73 secures a locking pin 63 near the far corner of the tub. The container is thus supported in a symmetrical position about the longitudinal axis.

Figure 8A:
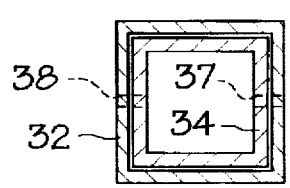
FIG. 8A is a cross-sectional illustration in the vertical plane across the x-axis of a rectangular tubular overlying strut and a rectangular tubular rail telecopably inserted in the overlying strut.
Figure 8B:
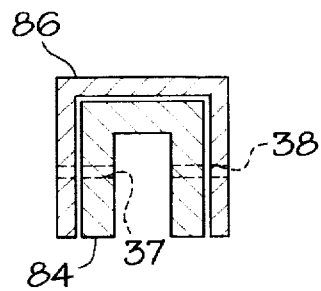
FIG. 8B is a cross-sectional illustration in the vertical plane across the x-axis of an overlying strut in the form of a rectangular channel, and a rail in the form of a rectangular channel telecopably inserted in the overlying strut.
Figure 8C:
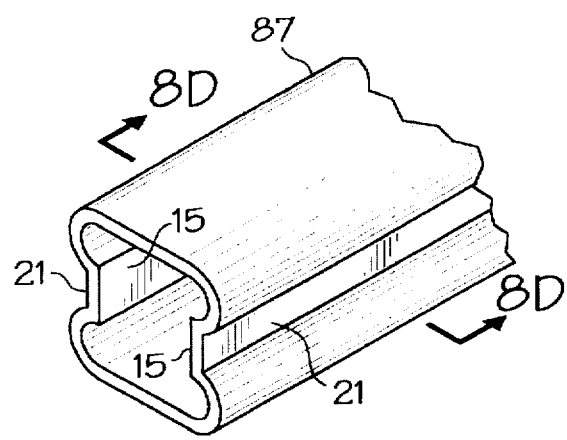
FIG. 8C is an isometric view of another embodiment of a rail.
Figure 8D:
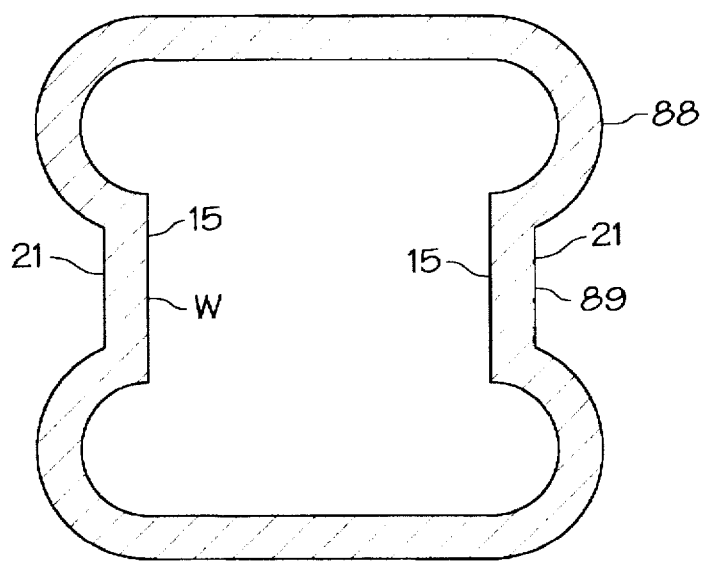
FIG. 8D is a cross-sectional illustration of the rail in FIG. 8C.
Figure 8E:
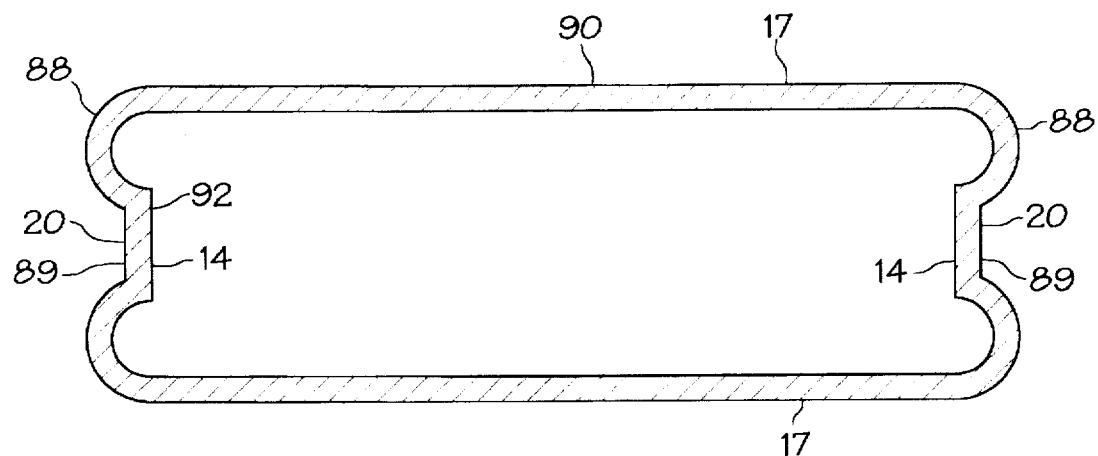
FIG. 8E is a cross-sectional illustration of another embodiment of a rail.
Figure 9:
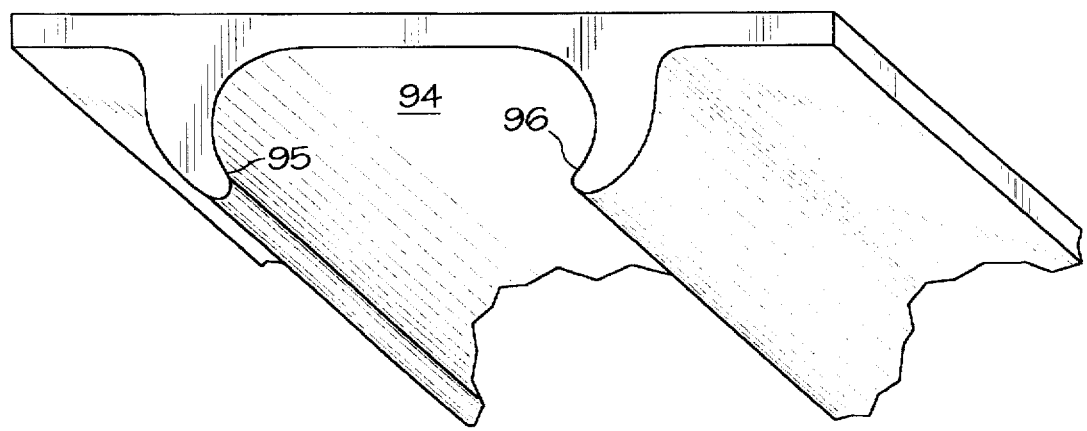
FIG. 9 is an isometric view of an overlying strut utilized in combination with a rail illustrated in FIGS. 6D and 6E.

Though square tubular stock is most advantageously used to construct the L, struts with other cross-sections may be used. FIG. 8A shows a cross-section of strut 32 and rail 34, each of square tubular stock, each provided with matching aligned through-passages 37 and 38 for a bolt to lock them together. A rail and strut having another cross-section may be used. Referring to FIG. 8B there is shown a C-channel rail 84 and an overlying C-channel strut 86 with through-passages 37 and 38 respectively. Referring to FIG. 8C is shown a section of generally square box-shaped tubing 87 having rounded corners 88, the opposed side walls W of which tubing are generally parallel, and in which are made inwardly concave grooves 89 coextensive with the vertical sidewalls, about the mid-center-line of the tubing. FIG. 8D is a cross-sectional view of FIG. 8C along the line B—B. Another rail 90 of rectangular box-shaped tubing having grooves 89 in the opposed vertical sidewalls 92 with rounded corners 88, is shown in FIG. 8E. Either rail is matingly fitted in a channel 94 in an overlying strut 95, shown in FIG. 9, which strut is slidable over either rail 87 or 90. The channel 94 is formed by pendent, inwardly convex opposed sidewalls 95 and 96 arcuately directed towards one another in confronting relationship, and formed with an inner radius to closely match the rounded corners 88, the lower terminal portion of each convex sidewall fitting in the grooves 89.

I claim:

1. A cargo carrier for a sports utility vehicle, having a rear which includes laterally spaced tail lights, said cargo carrier comprising,
   (i) an L-shaped support beam, in combination with
   (ii) a wheeled container having a rigid generally planar base pivotably disposed upon said support beam and releasably secured thereupon;
   said L-shaped support beam comprising,
   (a) an elongate rectilinear rail adapted for connecting said L-shaped support beam to said vehicle, said rail having a length sufficient to permit movement of said container on said rail for a sufficient distance to allow entry into the rear of said vehicle;
   (b) a rectilinear overlying longitudinal strut telescopably and non-rotatably disposed on said rail, movable on said rail away from the rear of the vehicle, and,
   (c) a transverse rectilinear strut extending at right angles to said overlying strut;
   said overlying longitudinal strut being at least as long as said planar base is wide, and having two longitudinally spaced-apart pivot latch means secured to said strut at a distance at least corresponding to the width of said planar base, said pivot latch means being adapted to support said container upon said longitudinal strut, to allow said container to be rotated in a vertical plane from one side only of said longitudinal strut, and, to allow said container to be secured in position;
   said transverse strut supporting that portion of said container not supported by said longitudinal strut, and extending for a sufficient distance along one side of said planar base and in close proximity to the rear of the vehicle, to afford stable support for said container;
   said container having fixedly secured thereto, (i) two oppositely directed, spaced-apart locking pins to be matingly received in said pivot latch means, respectively, said locking pins protruding longitudinally, and, (ii) coaxially spaced-apart wheels fixedly secured near one end of said base to allow said container to be rolled in an inclined attitude;
   said locking pins being insertable in said pivot latch means from one side of said longitudinal strut only, without lifting said wheels off the ground, thereafter to enable said container to be pivoted into a secured position; said container having a width less than that of a doorway through which it is to be rollingly transported in an inclined attitude, and a length less than the spacing between the tail lights of the vehicle.

2. The carrier of claim 1 wherein said transverse strut has fixedly secured thereto, at a location distally disposed relative to said longitudinal strut, an attachment latch to matingly receive a locking pin secured to said container, near the base thereof.

3. The carrier of claim 2 wherein said longitudinal strut has fixedly secured thereto, at a location distally disposed relative to said transverse strut, socket means to matingly receive a vertical post of an accessory rack.

4. The carrier of claim 1 wherein said pivot pins are located along an axis above said coaxial wheels, at a distance which is at least the distance of said pivot latches above the ground upon which said wheels rest.

5. The carrier of claim 4 wherein said container includes a tub having a volume in the range from about 15–30 ft$^3$ (0.42–0.85 cubic meters).

6. The carrier of claim 5 wherein said tub is substantially rigid and formed of a light weight material selected from the group consisting of a synthetic resinous material, a fiber reinforced synthetic resinous material, a metal composite and aluminum.

7. The carrier of claim 3 wherein said L-shaped support beam is constructed from rigid, rectilinear, rectangular tubular struts.

8. The carrier of claim 3 wherein said wheels on said tub are telescopable in a vertical direction to increase the distance between the axis of said wheels and the axis of said pivot pins, without moving said pivot pins.

9. The carrier of claim 1 wherein the direction of loading said container on said L-shaped support beam is from only one side of said truck, said direction being determined by the side on which said pivot latch means on said longitudinal strut matingly receive said locking pins.

10. The carrier of claim 9 wherein said tub is supported by only said longitudinal strut and said transverse strut, support extending over a major portion of the area of said base area but less than the area of said base, and said container is pivotable only in the vertical plane around a longitudinal axis defined by said longitudinal strut.

11. The carrier of claim 10 wherein said pivot latch means are oriented to receive said locking pins so that said longitudinal strut and said transverse strut are each in direct contact with the lower surface of said base, said longitudinal strut extends across said base and said transverse strut extends along only one side of said base.

12. The carrier of claim 11 wherein said locking pins project from pads secured to said the lower surface of said base, said pivot latch means are oriented to receive said locking pins so that said pads are supported on said longitudinal strut and said transverse strut, said longitudinal strut extends across said base and said transverse strut extends along only one side of said base.

* * * * *

UNITED STATES PATENT AND TRADEMARK OFFICE
CERTIFICATE OF CORRECTION

PATENT NO. : 5,732,866
DATED : March 31, 1998
INVENTOR(S) : Janek

It is certified that error appears in the above-identified patent and that said Letters Patent is hereby corrected as shown below:

Column 3, line 62, delete "6D and 6E" and insert -- 8D and 8E --

Column 10, line 7, delete "A-A" and insert -- 5A-5A --

Column 11, line 23 delete "B-B" and insert -- 8D-8D --

Signed and Sealed this

Ninth Day of February, 1999

*Attest:*

*Attesting Officer*

*Acting Commissioner of Patents and Trademarks*